United States Patent Office 3,301,826
Patented Jan. 31, 1967

---

3,301,826
VULCANIZATE OF SULFUR VULCANIZABLE RUBBER WITH N-MALEIMIDE DERIVATIVES
Pliny O. Tawney, deceased, late of Passaic, N.J., by Dorothy Ethel Tawney, executrix, Passaic, N.J., assignor to United States Rubber Company, New York, N.Y., a corporation of New Jersey
No Drawing. Filed Apr. 24, 1964, Ser. No. 363,067
5 Claims. (Cl. 260—78)

This application is a continuation-in-part of the application of Pliny O. Tawney, Serial No. 194,729, filed May 14, 1962, and now abandoned.

This invention relates to a new method of vulcanizing sulfur-vulcanizable rubber using a novel class of chemicals, referred to as the 2-maleimidoethyl half-esters of maleic and succinic acids and the metal salts thereof, and to the vulcanizates thus formed.

The subject compounds may be represented by the following formula:

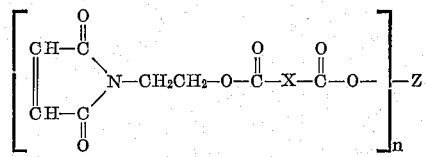

wherein —X— is a member selected from the group consisting of —CH$_2$CH$_2$— and —CH=CH— radicals, $n$ is an integer from 1 to 2, and Z is a member selected from the group consisting of a hydrogen atom when $n$ equals 1 and a divalent metal when $n$ equals 2.

According to the invention, said 2-maleimidoethyl half-esters of maleic and succinic acids can be prepared by the interaction of N-(2-hydroxyethyl)maleimide with maleic anhydride or succinic anhydride, respectively, in approximately equimolar proportions. The reaction for preparing the maleic half-ester may be illustrated as follows:

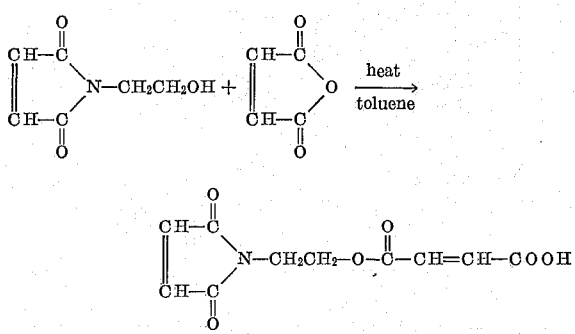

The reaction for preparing the succinic half-ester is similar except that succinic anhydride is substituted for maleic anhydride in the above formula.

The 2-maleimidoethyl half-esters of maleic and succinic acids, as well as the divalent metal salts thereof, e.g., the zinc, calcium, magnesium, copper, nickel, cobalt, etc., salts, may be used as vulcanizing agents for natural and synthetic rubbers having high olefinic unsaturation. The rubber is compounded in the conventional way with from 0.25 to 6.0 parts by weight, and preferably from 3.0 to 5.0 parts by weight, of the subject compounds per 100 parts of rubber, together with other conventional compounding agents, typically carbon black and an oily plasticizer, after which the stock is shaped and vulcanized in the manner well-known for the vulcanization of rubber. The subject compounds may be used as the sole vulcanizing agent or conjointly with other vulcanizing agents or accelerating agents, such as the organic disulfides and peroxides commonly used in the art.

The rubbers which are operable in this invention are the natural and the synthetic rubbers which have high olefinic unsaturation and which are conventionally vulcanized with sulfur. Such synthetic rubbers are the homopolymers of aliphatic conjugated diolefin hydrocarbons such as butadiene, isoprene, piperylene, 2,3-dimethylbutadiene, 3-methyl-1,3-pentadiene, 2-methyl-1,3-pentadiene, 1,3-hexadiene and 2,4-hexadiene and copolymers of such diolefins with monoolefinic compounds copolymerizable therewith. Such monoolefins include styrene; alpha-methylstyrene; p-methylstyrene; alpha, p-dimethylstyrene; acrylic and methacrylic nitriles, amides, acids and esters; vinyl pyridines; fumaric esters; methylenemalonic esters; vinylidene chloride; methyl vinyl ketone; and methyl isopropenyl ketone. Mixtures of such monoolefinic compounds can also be copolymerized with the diolefin. The term "high olefinic unsaturation" here connotes an amount of unsaturation on the order of that occurring in Hevea rubber. The copolymers must contain copolymerized therein at least about 35% of the diolefin hydrocarbon. The butyl rubbers, which are elastomers made by an ionic polymerization process from a major amount of an isoolefin and a minor amount of a conjugated diolefin hydrocarbon in an organic solvent, are excluded from the scope of the invention.

The synthetic rubbers referred to may be either emulsion polymers or stereospecific (or stereoregular) homopolymers and copolymers of aliphatic conjugated diolefin hydrocarbons, of which the polymers of greatest commercial interest now are cis-1,4-polyisoprene (often called synthetic natural rubber) and cis-1,4-polybutadiene.

The following examples illustrates the invention:

*Example I*

For the preparation of the maleic half-ester of N-(2-hydroxyethyl)maleimide, 72 grams (0.51 mole) of N-(2-hydroxyethyl)maleimide was placed in a 1 liter flask to which was added 40 grams (0.50 mole) of maleic anhydride and 300 ml. of toluene. The reaction mixture was stirred and heated at 100°–110° C. for 2.5 hours and then filtered hot. The filtrate was allowed to cool overnight, resulting in a yield of 63 grams of a white crystalline product melting at 67°–75° C. The product was recrystallized, first from benzene, then from ethylene dichloride. The 47 grams of crystalline product, i.e., the maleic half-ester of N-(2-hydroxyethyl)maleimide, had a melting point of 76°–77° C.

*Analysis.*—Calculated for C$_{10}$H$_9$NO$_6$: C, 50.3%; H, 3.80%; N, 5.81%. Found: C, 51.4%; H, 4.24%; N, 7.61%.

Example II

This example describes the preparation of the succinic half-ester of N-(2-hydroxyethyl)maleimide. 72 Grams (0.51 mole) of N-(2-hydroxyethyl)maleimide was placed in a 1-liter flask to which was added 50 grams (0.50 mole) of succinic anhydride and 300 ml. toluene. The reaction mixture was stirred and heated at 100°–110° C. for 2.5 hours, then filtered hot. The filtrate was allowed to cool. The supernatant liquor was decanted and the precipitate recrystallized from ethylene dichloride, yielding 50 grams of a white crystalline product melting at 91°–94° C. Further recrystallization from ethylene dichloride using Darco (activated carbon) resulted in a final yield of 40 grams of product, i.e., the succinic half-ester of N-(2-hydroxyethyl)maleimide, with a melting point of 93°–95° C.

*Analysis.*—Calculated for $C_{10}H_{11}NO_6$: C, 49.8%; H, 4.57%; N, 5.81%. Found: C, 49.6%; H, 4.63%; N, 5.41%.

Example III

This example demonstrates the preparation of the zinc salt of 2-maleimidoethyl acid maleate. Sixty (60) grams (0.25 mole) of 2-maleimidoethyl acid maleate (prepared according to the method shown in Example I) was placed in a 250 ml. beaker and melted on a hot plate (110° C.) To this was added 8.14 grams (0.1 mole) of zinc oxide. The zinc oxide reacted exothermically, causing the temperature to rise to 140° C. The reaction mixture was stirred approximately 15 minutes at 135°–140° C. at which time the melt was removed, cooled, and then triturated with 100 ml. of hot ethyl acetate. After cooling, the precipitate was filtered, yielding 36.7 grams of the zinc salt which melted at 55°–60° C. An additional 15.5 grams of product having the same melting point was obtained by partial concentration and refiltration of the filtrate.

*Analysis.*—Calculated for $C_{20}H_{16}ZnN_2O_{12}$: N, 5.18%; Zn, 12.01%. Found: N, 5.46%; Zn, 12.5%.

Example IV

This example demonstrates the preparation of the zinc salt of 2-maleimidoethyl acid succinate. A clear solution of the half-ester [4.35 gm. (0.018 mole) in 100 ml. water] prepared according to the method described in Example II was placed in a 250 ml. flask to which was added 1.25 gm. (0.010 mole) of zinc carbonate. The solution was brought to a near boil and immediately filtered hot. After allowing the filtrate to cool and concentrate in a petri dish, a precipitate formed which was then filtered and recrystallized from water, yielding 2.0 gm. of the zinc salt which melted at 93°–95° C.

Analysis for $C_{20}H_{20}ZnN_2O_{12}$.—Calculated: Zn, 12.0%; N, 5.14%. Found: Zn, 12.9%; N, 4.96%.

Example V

The following example illustrates the use of the chemicals of my invention, in combination with 2,2'-dibenzothiazyl disulfide, to cure a highly unsaturated rubber, namely, SBR.

A styrene-butadiene copolymer rubber with a styrene content of about 20 percent (SBR 1500) was compounded with 50 parts by weight, per hundred parts of rubber, of a high abrasion furnace black (Philblack O), 7.5 parts by weight of a naphthenic type oil, 2.0 parts by weight of 2,2'-dibenzothiazyl disulfide, and different levels of my half-esters as shown below. Compounding was carried out in the conventional manner. The rubber, black and oil were assembled and mixed in the Banbury for 10 minutes. Discharge temperature was 275°–300° F. The remainder of the ingredients were added on a cool two-roll mill. Stocks were cured for 22, 45 and 90 minutes, respectively, in a press at 320° F. and tested by the conventional testing methods used for rubber.

| Stock | Parts by Weight | |
|---|---|---|
| | 1 | 2 |
| SBR 1500 | 100.0 | 100.0 |
| HAF carbon black | 50.0 | 50.0 |
| Naphthenic type oil (a) | 7.5 | 7.5 |
| 2-maleimidoethyl acid maleate | 3.3 | |
| 2-maleimidoethyl acid succinate | | 5.0 |
| 2,2'-dibenzothiazyl disulfide | 2.0 | 2.0 | a Circosol 2XH—a mixture of comparatively high molecular weight hydrocarbons, sp. gr., 0.9465, aniline point, 175° F.

The following table shows the results of tests on the cured stocks.

| Physical Properties | Time of Cure (Minutes) | 1 | 2 |
|---|---|---|---|
| Tensile Strength (p.s.i.) | 22' | 2,680 | 1,900 |
| | 45' | 2,800 | 2,000 |
| | 90' | 2,810 | 2,120 |
| Elongation at Break (Percent) | 22' | 480 | 690 |
| | 45' | 450 | 680 |
| | 90' | 430 | 660 |
| Modulus at 300% (p.s.i.) | 22' | 1,300 | 500 |
| | 45' | 1,500 | 575 |
| | 90' | 1,675 | 650 |

Example VI

This example purports to show that the chemicals of my invention are also vulcanizing agents for highly unsaturated rubbers when used in combination with either dicumyl peroxide (Di-Cup-40C alone or with zinc oxide also added. The same base recipe was used as shown in Example V. Curing and testing were likewise carried out in the same manner.

| Stock | Parts by Weight | | |
|---|---|---|---|
| | 3 | 4 | 5 |
| SBR 1500 | 100.0 | 100.0 | 100.0 |
| HAF carbon black | 50.0 | 50.0 | 50.0 |
| Naphthenic type oil | 7.5 | 7.5 | 7.5 |
| 2-maleimidoethyl acid maleate | 4.5 | 4.5 | |
| 2-maleimidoethyl acid succinate | | | 5.0 |
| Di-Cup-40C | 1.0 | 1.0 | 1.0 |
| Zinc Oxide | | 3.0 | 3.0 |

The following table shows the results of tests made on the cured stocks.

| Physical Properties | Time of Cure (Minutes) | 3 | 4 | 5 |
|---|---|---|---|---|
| Tensile Strength (p.s.i.) | 22' | 2,310 | 2,750 | 2,450 |
| | 45' | 2,590 | 2,720 | 2,670 |
| | 90' | 2,720 | 1,980 | 2,690 |
| Elongation at Break (percent) | 22' | 580 | 440 | 500 |
| | 45' | 550 | 420 | 500 |
| | 90' | 480 | 410 | 470 |
| Modulus at 300% (p.s.i.) | 22' | 750 | 1,575 | 1,300 |
| | 45' | 1,000 | 1,800 | 1,400 |
| | 90' | 1,250 | 1,875 | 1,525 |

Examplye VII

This example demonstrates that the metal salts of this invention, prepared from the maleic and succinic half-esters of N-(2-hydroxyethyl)maleimide, are also effective in vulcanizing highly unsaturated rubbers. The compounding, processing and curing methods were the same as described in Example V.

| Stock | Parts by Weight | | | |
|---|---|---|---|---|
| | 6 | 7 | 8 | 9 |
| SBR 1500 | 100.0 | 100.0 | 100.0 | 100.0 |
| HAF carbon black | 50.0 | 50.0 | 50.0 | 50.0 |
| Naphthenic type oil | 7.5 | 7.5 | 7.5 | 7.5 |
| Zinc salt of 2-maleimidoethyl acid maleate | 4.5 | | 4.5 | |
| Zinc salt of 2-maleimidoethyl acid succinate | | 4.5 | | 4.5 |
| 2,2'-dibenzothiazyl disulfide | 2.0 | 2.0 | | |
| Di-Cup-40C | | | 0.7 | 0.7 |

The following table shows the results of tests made on the cured stocks.

| Physical Properties | Time of Cure (Minutes) | 6 | 7 | 8 | 9 |
|---|---|---|---|---|---|
| Tensile Strength (p.s.i.) | 22' | 1,600 | 1,275 | 2,100 | 1,350 |
| | 45' | 1,850 | 1,500 | 2,050 | 1,350 |
| Elongation at Break (percent) | 22' | 355 | 520 | 470 | 600 |
| | 45' | 355 | 550 | 430 | 550 |
| Modulus at 300% (p.s.i.) | 22' | 1,225 | 550 | 1,100 | 500 |
| | 45' | 1,375 | 585 | 1,200 | 550 |

*Example VIII*

This example will establish that the ingredients added as accelerating agents in the previous examples can not serve successfully as vulcanizing agents in their own right, and that therefore the presence of the novel vulcanizing agents is required in the recipes described in those examples in order to obtain an effective vulcanization of the rubbery polymers.

| Stock | Parts by Weight | |
|---|---|---|
| | 10 | 11 |
| SBR 1500 | 100 | 100 |
| HAF carbon black | 50 | 50 |
| Naphthenic type oil | 7.5 | 7.5 |
| 2,2'-dibenzothiazyl disulfide | 1.5 | |
| Di-Cup-40C | | 0.7 |

The following table shows the results of tests on the stocks cured for 15' and 30', respectively, in a press at 320° F.

| Physical Properties | Time of Cure | 10 | 11 |
|---|---|---|---|
| Tensile Strength (p.s.i.) | 15' | 325 | 725 |
| | 30' | 400 | 725 |
| Percent Elongation at Break | 15' | 725 | 720 |
| | 30' | 670 | 635 |
| Modulus at 300% (p.s.i.) | 15' | 175 | 275 |
| | 30' | 200 | 300 |

A comparison of the physical properties obtained in this example with those obtained in Examples V through VII readily shows the substantial lack of vulcanization obtained in this example, from which it can be concluded that neither dicumyl peroxide (Di-Cup-40C) nor 2,2'-dibenzothiazyl disulfide by themselves serve as vulcanizing agents, and that therefore the vulcanization obtained in Examples V through VII must be due to the use of the novel compounds there used.

Having thus described my invention, what I claim and desire to protect by Letters Patent is:

1. A vulcanizate comprising the heat reaction product of 100 parts of a sulfur-vulcanizable rubber selected from the group consisting of homopolymers of aliphatic conjugated diolefin hydrocarbons having from 4 to 6 carbon atoms and heteropolymers of such diolefin hydrocarbons with copolymerizable monoolefinic compounds, said heteropolymers containing at least 35% of said diolefin hydrocarbon copolymerized therein, which has been vulcanized with from 0.25 to 6 parts of a compound represented by the formula

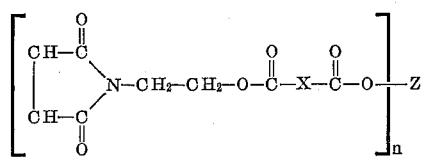

wherein —X— is a member selected from the group consisting of —$CH_2CH_2$— and —CH=CH— radicals, $n$ is an integer from 1 to 2, and Z is a member selected from the group consisting of a hydrogen atom when $n$ equals 1 and a divalent metal when $n$ equals 2, as a vulcanizing agent.

2. The vulcanizate of claim 1 wherein said sulfur-vulcanizable rubber is a styrene-butadiene copolymer rubber and said vulcanizing agent is the maleic acid half-ester of N-(2-hydroxyethyl)maleimide.

3. The vulcanizate of claim 1 wherein said sulfur-vulcanizable rubber is a styrene-butadiene copolymer rubber and said vulcanizing agent is the succinic acid half-half-ester of N-(2-hydroxyethyl)maleimide.

4. The vulcanizate of claim 1 wherein said sulfur-vulcanizable rubber is a styrene-butadiene copolymer rubber and said vulcanizing agent is the divalent metal salt of the 2-maleimidoethyl half-ester of an acid selected from the group consisting of maleic and succinic acids.

5. The vulcanizate of claim 1 wherein said sulfur-vulcanizable rubber is a styrene-butadiene copolymer rubber and said vulcanizing agent is the zinc salt of the 2-maleimidoethyl half-ester of an acid selected from the group consisting of maleic and succinic acids.

References Cited by the Examiner

UNITED STATES PATENTS 3,153,014  10/1964  Fletcher et al. _____ 260—78

FOREIGN PATENTS 1,049,577  2/1959  Germany.

WILLIAM H. SHORT, *Primary Examiner.*

LEON J. BERCOVITZ, *Examiner.*

H. D. ANDERSON, *Assistant Examiner.*